(12) United States Patent
Fujiwara et al.

(10) Patent No.: US 7,930,901 B2
(45) Date of Patent: Apr. 26, 2011

(54) OPTICAL GLASS, PRECISION PRESS-MOLDING PREFORM, OPTICAL ELEMENT AND PROCESSES FOR PRODUCTION OF THESE

(75) Inventors: Yasuhiro Fujiwara, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/314,399

(22) Filed: Dec. 10, 2008

(65) Prior Publication Data
US 2009/0139268 A1 Jun. 4, 2009

Related U.S. Application Data

(62) Division of application No. 11/077,360, filed on Mar. 11, 2005, now abandoned.

(30) Foreign Application Priority Data

Mar. 15, 2004 (JP) .................................. 2004-072115

(51) Int. Cl.
  C03B 11/00 (2006.01)
  C03C 3/21 (2006.01)
  C03C 3/062 (2006.01)
  C03C 3/16 (2006.01)

(52) U.S. Cl. .................. 65/64; 65/102; 501/45; 501/46; 501/47; 501/73

(58) Field of Classification Search .................. 501/45, 501/46, 47, 73; 65/64, 102
See application file for complete search history.

(56) References Cited

U.S. PATENT DOCUMENTS

| | | | |
|---|---|---|---|
| 6,743,743 B2 | 6/2004 | Sato | 501/47 |
| 6,995,101 B2 | 2/2006 | Zou et al. | 501/46 |
| 7,060,640 B2 | 6/2006 | Ogino et al. | 501/45 |
| 7,140,205 B2 * | 11/2006 | Fujiwara et al. | 65/64 |
| 7,309,670 B2 * | 12/2007 | Fujiwara et al. | 501/46 |
| 2002/0042337 A1 | 4/2002 | Zou et al. | 501/45 |
| 2002/0073735 A1 * | 6/2002 | Hayashi et al. | 65/32.1 |
| 2003/0209035 A1 * | 11/2003 | Fujiwara et al. | 65/24 |
| 2004/0018933 A1 * | 1/2004 | Ogino et al. | 501/45 |
| 2004/0266602 A1 * | 12/2004 | Fujiwara et al. | 501/46 |
| 2005/0032621 A1 * | 2/2005 | Zou et al. | 501/46 |
| 2005/0049132 A1 | 3/2005 | Shiraishi | 501/46 |
| 2005/0113239 A1 | 5/2005 | Miyata et al. | 501/45 |
| 2005/0159290 A1 | 7/2005 | Yamamoto et al. | 501/45 |
| 2005/0164862 A1 | 7/2005 | Shiraishi | 501/45 |
| 2005/0188724 A1 * | 9/2005 | Ikenishi et al. | 65/31 |
| 2006/0058171 A1 | 3/2006 | Izuki | 501/47 |
| 2006/0081010 A1 | 4/2006 | Zou et al. | 65/385 |
| 2007/0027016 A1 | 2/2007 | Ogino et al. | 501/45 |

FOREIGN PATENT DOCUMENTS

| | | |
|---|---|---|
| JP | 8-157231 | 6/1996 |
| JP | 9-188540 | 7/1997 |
| JP | 2003-160355 | 6/2003 |
| JP | 2003-335549 | 11/2003 |
| JP | 2004-002153 | 1/2004 |

* cited by examiner

Primary Examiner — Karl E Group
Assistant Examiner — Elizabeth A Bolden
(74) Attorney, Agent, or Firm — Nixon & Vanderhye P.C.

(57) ABSTRACT

Provided are optical glasses having a phosphate-containing composition that can materialize highly useful optical properties including high-refractivity and high-dispersion properties; an optical glass comprising $P_2O_5$, $SiO_2$ and $Li_2O$ as essential components, comprising $Na_2O$ and $K_2O$ as optional components, having an $Li_2O/(Li_2O+Na_2O+K_2O)$ molar ratio of from ⅓ to 1 and having an Abbe's number (vd) of 30 or less, and an optical glass comprising $P_2O_5$, $SiO_2$ and $Li_2O$ as essential components, having the property of transmittance that when light is caused to vertically enter one of two plane and mutually parallel optically polished surfaces of a sample of the glass having a thickness of 10.0±0.1 mm and caused to exit from the other surface, the wavelength at which the transmittance represented by the ratio of transmitted light intensity to incidence light intensity (transmitted light intensity/incidence light intensity) comes to be 70% is 510 nm or less, having a refractive index (nd) of 1.80 or more and an Abbe's number (vd) of 30 or less and having a liquidus temperature of less than 1,000° C.

1 Claim, 1 Drawing Sheet

OPTICAL GLASS, PRECISION PRESS-MOLDING PREFORM, OPTICAL ELEMENT AND PROCESSES FOR PRODUCTION OF THESE

This application is a divisional of application Ser. No. 11/077,360, filed Mar. 11, 2005, now abandoned, which claims priority to Japanese Application No. 2004-072115, filed Mar. 15, 2004, the entire contents of which are hereby incorporated by reference in this application.

FIELD OF THE INVENTION

The present invention relates to an optical glass mainly for use in precision press-molding, a precision press-molding preform formed of a glass, an optical element formed of a glass, and processes for producing the above optical glass, the above preform and the above optical element.

TECHNICAL BACKGROUND

In recent years, there are increasing demands for lenses for constituting image-sensing optical systems of digital cameras, and the like. Under the circumstances, processes called precision press-molding or mold optics shaping are attracting attention as a lens production process capable of supplying a large amount of lenses formed of a glass in a small delivery period. However, an optical glass for precision press-molding is required to have not only properties required of general optical glasses but also the property of being softened at a low temperature ("low-temperature softening property" hereinafter), and such optical glasses constitutes a unique region clearly distinguishable from the region of conventional optical glasses.

On the other hand, from the viewpoint of optical designing in an image-sensing optical system, there is demanded a lens formed of a high-refractivity and high-dispersion glass, and there are increasing demands for glass materials for providing such lenses by the above precision press-molding.

For example, such a glass is disclosed in JP-A-2003-160355.

The invention disclosed in the above JP-A-2003-160355 provides a glass containing components such as $P_2O_5$, $Nb_2O_5$, $Bi_2O_3$, $TiO_2$, $WO_3$ and an alkali metal oxide, so that there is materialized a high-refractivity and high-dispersion glass having the low-temperature softening property that the precision press-molding requires.

In the precision press-molding, there is first prepared a preliminary shaped material that is formed of an optical glass having a weight precisely in agreement with the weight of a precision press-molded product as an end product and that is called a preform having a form (e.g., a sphere) suitable for press-molding, and the preliminary shaped material is heated and pressed with a press mold.

In the invention disclosed in the above JP-A-2003-160355, a molten glass is cast into a mold (die), glass gobs having a predetermined weight each are cut from the obtained glass, and preforms are prepared therefrom by a polishing method.

However, such a method requires much labor and a time and also increases a production cost, and the problem is that it is difficult to comply with the demand for the above preforms and optical elements. In contrast, when there can be materialized a hot preform shaping method in which a molten glass in a necessary amount is prepared and caused to flow out of a flow pipe, molten glass gobs are separated one after another from the molten glass flowing out of the flow pipe and the molten glass gobs are shaped into preforms before the they are cooled to solidness to produce a number of the preforms one after another, the preform production can be remarkably improved in productivity as compared with the above method. Further, when this hot preform shaping method is combined with a float-shaping method in which the above molten glass gob is shaped into a preform while the glass gob is caused to float by applying air (gas) pressure thereto, there can be produced a preform of which the entire surface is smoother.

The hot preform shaping method and the float-shaping method are excellent as described above. However, a glass for forming preforms is further required to have hot preform shapeability. That is, it is required to satisfy the following conditions. A molten glass is to be caused to flow out of a pipe in a temperature region in which the glass is not devitrified. A glass gob having a predetermined weight is to be separated without using a cutting blade. A glass gob is to be caused to float by applying air (gas) pressure.

When a glass can be imparted with excellent hot preform shapeability, not only the hot shaping and float-shaping of a preform are made possible, but also there can be prevented a decrease in yields which is caused by devitrification, etc., when a molten glass is formed into a glass.

DISCLOSURE OF THE INVENTION

Under the circumstances, it is an object of the present invention to provide an optical glass that is a phosphate-containing glass capable of materializing highly useful optical properties such as high-refractivity and high-dispersion properties and that has high stability while maintaining precision press-moldability, a precision press-molding preform formed of the above optical glass, an optical element obtained by precision press-molding the above optical glass or preform, and processes for producing the above optical glass, the above precision press-molding and the above optical element.

The present inventors have made diligent studies and have found that the above object can be achieved by a phosphate-containing optical glass having a specific composition and a specific Abbe's number, a phosphate-containing optical glass having a specific transmittance, optical constants and liquidus temperature, preforms formed of such optical glasses and optical elements formed by molding the preforms, and by employing specific production processes, and on the basis of the above finding, the present invention has been completed.

That is, the present invention provides, (1) an optical glass comprising $P_2O_5$, $SiO_2$ and $Li_2O$ as essential components, comprising $Na_2O$ and $K_2O$ as optional components, having an $Li_2O/(Li_2O+Na_2O+K_2O)$ molar ratio of from ⅓ to 1 and having an Abbe's number (vd) of 30 or less, (2) the optical glass of the above (1), which has a refractive index (nd) of 1.80 or more, (3) an optical glass comprising $P_2O_5$, $SiO_2$ and $Li_2O$ as essential components, having the property of transmittance that when light is caused to vertically enter one of two plane and mutually parallel optically polished surfaces of a sample of the glass having a thickness of 10.0±0.1 mm and caused to exit from the other surface, the wavelength at which the transmittance represented by the ratio of transmitted light intensity to incidence light intensity (transmitted light intensity/incidence light intensity) comes to be 70% is 510 nm or less, having a refractive index (nd) of 1.80 or more and an Abbe's number (vd) of 30 or less and having a liquidus temperature of less than 1,000° C., (4) the optical glass of any one of the above (1) to (3), which comprises at least one component selected from $Nb_2O_5$, $WO_3$, $TiO_2$ or $Bi_2O_3$, (5) the optical glass of any one of the above (1) to (4), which is a glass for precision press-molding, (6) a process for producing an optical glass comprising $P_2O_5$ and $SiO_2$ as glass components, which comprises either heating and melting a first raw material comprising $SiO_2$ to make a melt, or preparing a cullet raw material from said melt, mixing a second raw material comprising a phosphoric acid compound, a melt obtained by heating and melting said second raw material or a cullet raw material obtained from said melt of the second raw material with said melt of the first raw material or the cullet raw material obtained from said melt of the first raw material, melting the mixture and melting said optical glass.

(7) a precision press-molding preform formed of the optical glass of the above (5), (8) a precision press-molding preform that is formed of an optical glass comprising, as essential components, $P_2O_5$, $SiO_2$ and an alkali metal oxide including $Li_2O$, having an $SiO_2$ content of 0.5 to 4 mol % and having a refractive index (nd) of 1.80 or more and an Abbe's number (vd) of 30 or less, and of which the entire surface is formed by solidification of said glass in a molten state or is a free surface, (9) a process for producing a precision press-molding preform, which comprises separating a molten glass gob having a predetermined weight from a glass in a molten state and shaping said molten glass gob into that preform of the above (7) or (8) which has a weight equivalent to said weight before said molten glass gob is cooled to solidness,

(10) a process for producing a precision press-molding preform, which comprises separating a molten glass gob having a predetermined weight from an optical glass in a molten state, the optical glass being produced by the process for producing an optical glass as recited in the above (6), and shaping said molten glass gob into a preform having a weight equivalent to said weight before said molten glass gob is cooled to solidness,

(11) an optical element formed of the optical glass of any one of the above (1) to (5),

(12) a process for producing an optical element, which comprises precision press-molding a preform formed of a glass, wherein the precision press-molding preform of the above (7) or (8) is precision press-molded,

(13) a process for producing an optical element, which comprises precision press-molding a preform formed of a glass, wherein a precision press-molding preform produced by the process of the above (9) or (10) is precision press-molded,

(14) the process for producing an optical element as recited in the above (12) or (13), wherein the precision press-molding preform is introduced into a press mold, and said preform and said press mold are heated together, and

(15) the process for producing an optical element as recited in the above (12) or (13), wherein the precision press-molding preform heated is introduced into the press mold to precision press-mold the preform.

EFFECT OF THE INVENTION

According to the present invention, there can be provided an optical glass that is a phosphate-containing glass capable of materializing highly useful optical properties such as high-refractivity and high-dispersion properties, etc., and that has high stability with maintaining precision press-moldability.

Further, there can be provided a precision press-molding preform formed of the above glass and an optical element obtained by precision press-molding the above optical glass or the above preform, and there can be also provided processes for producing the above optical glass, the above precision press-molding preform and the above optical element.

PREFERRED EMBODIMENTS OF THE INVENTION

Figure 1:
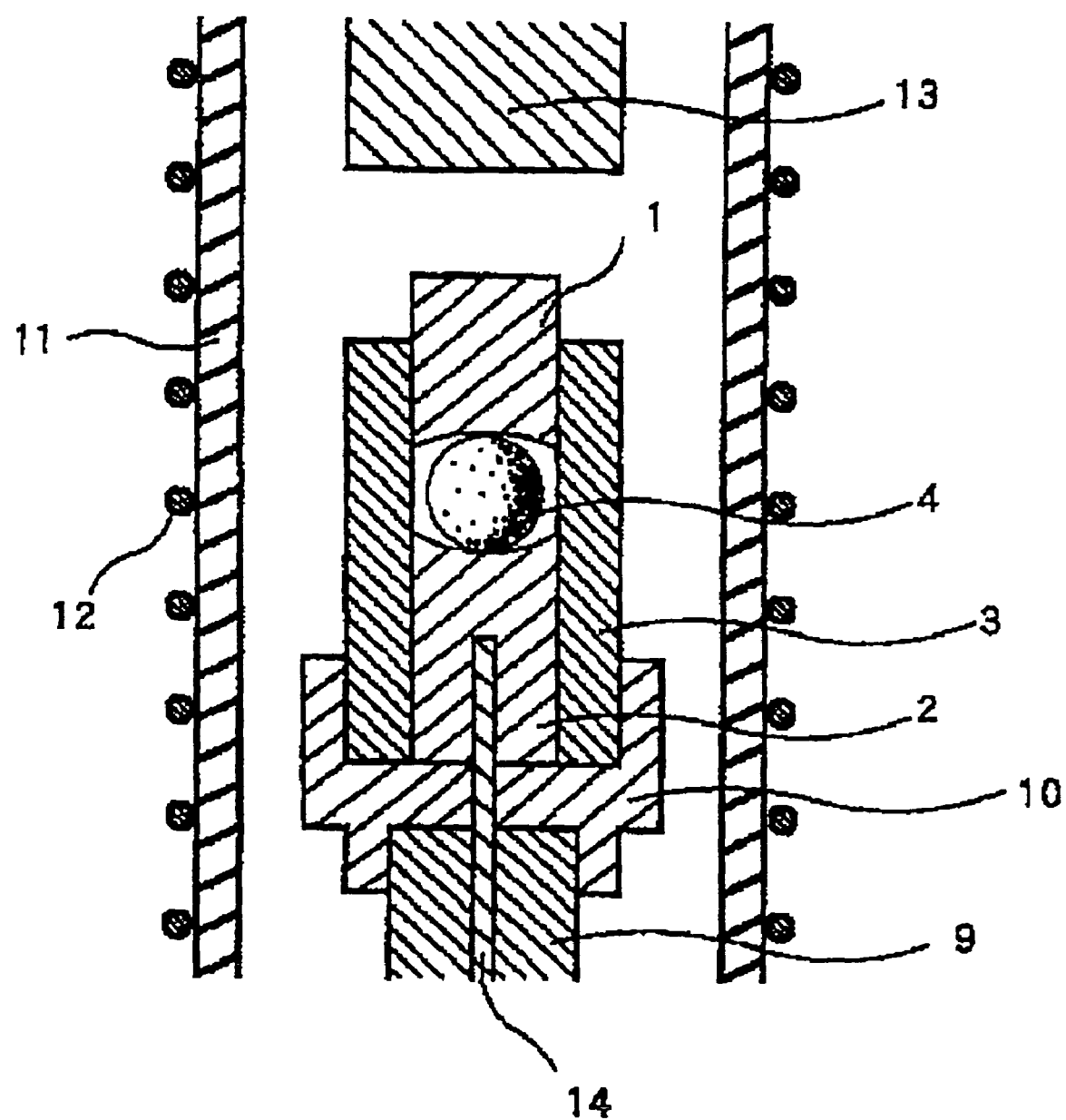
FIG. 1 is a schematic cross-sectional view of one example of a precision press-molding apparatus used in Example.

First, the optical glass of the present invention will be explained below.

The optical glass of the present invention is provided for precision press-molding. The precision press-molding is also called "mold optics molding" and refers to a method for forming that surface of an optical element which performs an optical function (to be referred to as "optical function surface" hereinafter), for example, a surface that refracts, reflects (including a total reflection and partial reflection), diffracts or transmits light, by press molding. In the above method, an aspherical lens and a very small lens can be produced without mechanically processing a lens surface, so that optical elements having a precise form can be highly productively produced. In addition, the mechanical processing of the circumference of a lens surface for centering and edging is not what impairs the above feature of the precision press-molding.

[Optical Glass]

(Glass I)

The first optical glass of the present invention (to be referred to as "glass I" hereinafter) is an optical glass comprising $P_2O_5$, $SiO_2$ and $Li_2O$ as essential components, comprising $Na_2O$ and $K_2O$ as optional components, having an $Li_2O/(Li_2O+Na_2O+K_2O)$ molar ratio of from $\frac{1}{3}$ to 1 and having an Abbe's number (vd) of 30 or less.

In the glass I, $P_2O_5$ forms the network structure of the glass and is an essential component for imparting the glass with stability enabling the production of the glass, and it is an important component for materializing excellent precision press-moldability in the region of the above optical constants.

An alkali metal is a useful component that works to improve the glass in meltability and works to decrease the softening temperature of the glass. Of alkali metals, Li particularly has a small ionic radius as compared with any other alkali metal, so that it has a higher effect on dense packing of elements contained per a glass unit volume than any other alkali metal. For obtaining a high-refractivity glass as an end product of the present invention, therefore, Li is used in a larger amount than Na or K with respect to alkali metal components, so that the high-refractivity component contained in the glass can be more densely packed and that the refractive index can be accordingly increased.

When a large amount of $Li_2O$ is used as a glass component for the above reason, a high refractive index can be attained while maintaining the meltability and low-temperature softening property of the glass, so that $Li_2O$ is a remarkably important component for obtaining a high-refractivity glass that is easy to melt and process. When the content of $Li_2O$ is too large, however, the liquidus viscosity of the glass is decreased or the glass is degraded in thermal stability, which impairs the meltability and processability of the glass, so that there is a preferred upper limit to be imposed on the content of $Li_2O$.

For the above reason, the $Li_2O/(Li_2O+Na_2O+K_2O)$ molar ratio is limited to from 1/3 to 1, preferably at least 2/5 but less than 9/10, more preferably at least 1/2 but less than 4/5.

For the above reason, similarly, the total content of $Li_2O$, $Na_2O$ and $K_2O$ is desirably at least 28 mol % but less than 42 mol %, more desirably at least 30 mol % but less than 40 mol %.

For the above reason, similarly, the content of $Li_2O$ is more desirably at least 2% by weight, still more desirably at least 4% by weight. On the other hand, of the alkali components, the total content of $Na_2O$ and $K_2O$ used as components other than $Li_2O$ is desirably less than 10% by weight, more desirably less than 9% by weight, still more preferably less than 8% by weight.

$SiO_2$ is a component for forming the network structure of the glass, and it is an essential component not only for bringing the viscosity of the glass in a molten state in a high-temperature region into a range suitable for hot preform shaping but also for serving to improve the glass in stability, durability and the property of transmittance.

The glass I not only has the low-temperature softening property but also generally has the property of high refractivity, that is, a refractive index (nd) of 1.80 or more.

(Glass II)

The second optical glass of the present invention (to be referred to as "glass II" hereinafter) comprises $P_2O_5$, $SiO_2$ and $Li_2O$ as essential components and has the property of transmittance that when light is caused to vertically enter one of two plane and mutually parallel optically polished surfaces of the glass and caused to exit from the other surface, the wavelength at which the transmittance represented by the ratio of transmitted light intensity to incidence light intensity (transmitted light intensity/incidence light intensity) comes to be 70% is 510 nm or less, having a refractive index (nd) of 1.80 or more and an Abbe's number (vd) of 30 or less and having a liquidus temperature of less than 1,000° C. The above explanation applies to a glass that is prepared by cooling a glass in a molten state and processing the same, and that is not re-heated after it is cooled to room temperature.

The glass II shows a transmittance that increases with an increase in wavelength in a visible light region and exhibits a high transmittance in an increased wavelength region. For example, incidence light is caused to enter one of the mutually parallel, flat and optically polished two surfaces of an optically polished glass sample having a thickness of 10±0.1 mm. The glass is measured for a ratio of the intensity of transmitted light going out of the other optically polished surface to the intensity of incidence light (transmittance represented by transmitted light intensity/incidence light intensity ("spectral transmittance" hereinafter)) while the wavelength of incidence light is scanned in the wavelength region of 280 to 700 nm. In this case, a glass having the property of transmittance that the wavelength at which the above spectral transmittance comes to be 80% ("λ80" hereinafter) is 600 nm or less is preferred, a glass having the property of transmittance that the wavelength at which the above spectral transmittance comes to be 80% is 580 nm or less is more preferred, and a glass having the property of transmittance that the wavelength at which the above spectral transmittance comes to be 80% is 560 nm or less is still more preferred. Similarly, a glass having the property of transmittance that the wavelength at which the above spectral transmittance comes to be 70% ("λ70" hereinafter) is 510 nm or less is preferred, a glass having the property of transmittance that the wavelength at which the above spectral transmittance comes to be 70% is 490 nm or less is more preferred, and a glass having the property of transmittance that the wavelength at which the above spectral transmittance comes to be 70% is 470 nm or less is still more preferred. Further, a glass having the property of transmittance that the wavelength at which the above spectral transmittance comes to be 5% ("λ5" hereinafter) is 410 nm or less is preferred, a glass having the property of transmittance that the wavelength at which the above spectral transmittance comes to be 5% is 400 nm or less is more preferred, and a glass having the property of transmittance that the wavelength at which the above spectral transmittance comes to be 5% is 390 nm or less is still more preferred. In a wavelength region that is within 280 to 700 nm and that is a longer wavelength region than λ80, the optical glass II exhibits a spectral transmittance of over 80%, in a wavelength region that is a longer wavelength region than λ70, the optical glass II exhibits a spectral transmittance of over 70%, and in a wavelength region that is a longer wavelength region than λ5, the optical glass II exhibits a spectral transmittance of over 5%. When the thickness of a glass differs from the above value, the spectral transmittance can be converted on the basis of the thickness of a sample according to a known method. The above spectral transmittance is a value excluding a reflection loss on the glass surface.

The glass II preferably has the properties of the glass I.

(Points Common to Glass I and Glass II)

Points common to the glasses I and II will be explained below. The glasses I and II will be generally referred to as "glass of the present invention" hereinafter.

In the glass of the present invention, there is no special limitation to be imposed on the upper limit of the refractive index (nd). The refractive index (nd) of the glass of the present invention is preferably in a range in which the refractive index (nd) is at least 1.82 but not more than 2, more preferably in a range in which the refractive index (nd) is at least 1.84 but not more than 2. Further, while the lower limit of the Abbe's number (vd) is not specially specified, an Abbe's number (vd) of 17 or more can be employed as a criterion of the lower limit.

Preferred contents of the components in the glass of the present invention will be explained below. Contents by % described below represent contents by mol % unless otherwise specified.

The content of $P_2O_5$ is generally 10 to 35%, preferably 15 to 30%, more preferably 17 to 28%. When $P_2O_5$ is introduced to excess, the glass transition temperature and the sag temperature are increased, and the glass is degraded in weather resistance. When the content of $P_2O_5$ is too small, the glass is intensely liable to devitrify and is destabilized.

The content of $SiO_2$ is desirably 0.5 to 4%, more desirably 0.5 to 3%. $SiO_2$ has effects as described above. When it is introduced to excess, an $SiO_2$ raw material is not completely dissolved and remains in the glass as a foreign matter. That is, the content of $SiO_2$ can be such a content in which no non-dissolved matter remains in the glass and the predetermined optical constants can be obtained, and the above-described content can be employed as a criterion.

When $SiO_2$ is introduced, the viscosity at a liquidus temperature can be increased and can be brought into a range of 2 to 20 dPa·s, so that the glass can be improved in hot preform shapeability.

As an alkali metal oxide, it is preferred to use $Li_2O$ alone or it is preferred to use $Na_2O$ and/or $K_2O$ together with $Li_2O$. In this case, it is required to limit the total content of the alkali metal oxides to less than the predetermined content as is already explained.

In the above limited content, the total content of the alkali metal oxides is desirably less than 40%, more desirably 38% or less, and it is desirably at least 6%, more desirably 10% or more, still more preferably 11% or more.

Further, the content of $Li_2O$ is preferably 2 to 25%, more preferably 4 to 20%, still more preferably 5 to 20%. The content of $Na_2O$ is preferably 4 to 25%, more preferably 5 to 20%. The content of $K_2O$ is preferably 0 to 15%, more preferably 1 to 8%. From the viewpoint of an improvement in precision press-moldability, it is desirable to introduce at least 2% by weight of $Li_2O$.

While $B_2O_3$ is optional, $B_2O_3$ is very effective for improving the glass in meltability and homogenizing the glass. At the same time, when $B_2O_3$ is introduced in a small amount, the property of bonding of OH in the glass is changed, and it is very effective for preventing the foaming of the glass during precision press-molding. It is therefore preferred to introduce 0 to 15% of $B_2O_3$, and it is more preferred to introduce 1 to 12% of $B_2O_3$.

$Nb_2O_5$, $WO_3$, $TiO_2$ and $Bi_2O_3$ are preferably introduced in a total amount of 25 to 45 mol % for satisfying various conditions required of the glass as a precision press-molding glass while imparting the glass with the predetermined optical constants.

$Nb_2O_5$ is an important component having a high effect on imparting the glass with high-refractivity and high-dispersion properties. When the content of $Nb_2O_5$ is too large, the glass is degraded in meltability and stability, and the glass transition temperature and sag temperature are also increased, so that the glass is liable to be foamed or colored during precision press-molding. When the content of $Nb_2O_5$ is too small, the effect on imparting the glass with high-refractivity and high-dispersion properties decreases. Therefore, the content of $Nb_2O_5$ is preferably 5 to 25%, more preferably 10 to 25%, still more preferably 12 to 23%.

$WO_3$ is also an important component having a high effect on imparting the glass with high-refractivity and high-dispersion properties. Further, it also has an effect on decreasing the glass transition temperature and sag temperature. Further, $WO_3$ has the effect of inhibiting the wettability between a preform and a press mold during precision press-molding, so that it works to improve the releasability of the glass from a mold in precision press-molding. However, when the content of $WO_3$ is too large, a precision press-molding preform formed of the optical glass of the present invention is liable to be colored, and the high-temperature viscosity of the glass is decreased, so that it is difficult to shape a preform by causing a molten glass to flow out of a flow pipe. Therefore, the content of $WO_3$ is preferably 0 to 40%, more preferably over 0% but not more than 40%, still more preferably 0.1 to 40%, yet more preferably 2 to 40%, particularly preferably 2.5 to 30%.

$TiO_2$ also has effects on increasing the refractivity and dispersion of the glass and improving the glass in stability. However, when the content of $TiO_2$ is too large, the glass is degraded in stability and the property of transmittance, the glass transition temperature, sag temperature and liquidus temperature of the glass are sharply increased, and the glass is liable to be colored during precision press-molding. Therefore, the content of $TiO_2$ is preferably 0 to 10%, more preferably 1 to 10%, still more preferably 2 to 8%.

$Bi_2O_3$ also has an effect on increasing the refractivity and dispersion of the glass and has an effect on improving the glass in stability and weather resistance. However, when the content of $Bi_2O_3$ is too large, the glass is liable to be devitrified and colored during the production of preforms. Therefore, the content of $Bi_2O_3$ is preferably 0 to 15%, more preferably 0.1 to 15%, still more preferably 0.5 to 12%, yet more preferably 1 to 12%.

While $Nb_2O_5$, $WO_3$, $TiO_2$ and $Bi_2O_3$ are useful components as described above, when the content of these components is increased, the content of the alkali metal oxide(s) and $B_2O_3$ for improving the meltability of the glass is relatively decreased. When the glass is imparted with high-refractivity and high-dispersion properties, therefore, the glass is liable to be degraded in meltability. While $SiO_2$ is a component having the above effects, a phosphate-containing glass having less content of an alkali metal oxide and $B_2O_3$ and particularly having a composition that exhibits high refractivity or high dispersion is very difficult to melt according to a conventional method in which a formulated glass raw material is melted under heat, and it is difficult to introduce $SiO_2$ to such a glass. A glass that is included in the above glass and in which the total content of $B_2O_3$, $Li_2O$, $Na_2O$ and $K_2O$ is less than 20% by weight, particularly, less than 17% by weight, further, less than 15% by weight, is an excellent glass in view of properties, while it is difficult to materialize such a glass due to a meltability problem. According to a novel glass melting method to be described later, however, there has been found the optical glass of the present invention that is remarkably useful for precision press-molding. This glass melting method will be explained in detail later.

Other optional components will be explained below.

BaO is a component useful for increasing the refractive index (nd), improving the glass in stability and decreasing the liquidus temperature. However, when BaO is introduced to excess, the glass is degraded in stability, and the glass transition temperature and sag temperature are increased, so that the content of BaO is preferably 0 to 15%, more preferably 0 to 12%, still more preferably 0.1 to 12%. Further, when BaO is co-present with $WO_3$, BaO prevents the degradation of the glass in stability even when the content of $WO_3$ is increased, and BaO also works to prevent the coloring of the glass. When $WO_3$ is contained, therefore, it is preferred to incorporate BaO.

ZnO works to increase the refractivity and dispersion and works to decrease the glass transition temperature, sag temperature and liquidus temperature even when a small amount of ZnO is introduced. When ZnO is introduced to excess, however, the glass is degraded in stability, and the liquidus temperature is also increased. Therefore, the content of ZnO is preferably 0 to 12%, more preferably 1 to 10%, still more preferably 2 to 8%.

From the viewpoint of moldability of the glass in a molten state, particularly hot preform moldability, precision press-moldability and optical properties, the total content of $P_2O_5$, $SiO_2$, $Li_2O$, $Na_2O$, $K_2O$, $B_2O_3$, $Nb_2O_5$, $WO_3$, $TiO_2$, $Bi_2O_3$, BaO and ZnO is preferably over 95%, more preferably over 98%, particularly preferably 100%.

In addition to these components, $La_2O_3$, $Y_2O_3$, $Gd_2O_3$, $ZrO_2$, $Ta_2O_5$, CaO, MgO, $Cs_2O$, etc., may be introduced as optional components. However, desirably, the content of each component is limited to less than 5%, preferably to less than 2%, and the total content of these components is limited to less than 5%, preferably to less than 2%. Concerning $TeO_2$, it is required to limit the content of $TeO_2$ to 9% by weight or less, and the content of $TeO_2$ is preferably 2% by weight or less. When toxicity is taken into account, it is preferred to limit the content of $TeO_2$ to 1% by weight or less, and it is particularly preferred to preclude $TeO_2$. Concerning $GeO_2$, it is required to limit the content thereof to 2% by weight or less, and since it is an expensive raw material, it is desirable to limit the content thereof to 1% by weight or less. More desirably, no $GeO_2$ is used. Further, desirably, no $Ta_2O_5$ is introduced in view of a cost, although $Ta_2O_5$ is not so expensive as $GeO_2$.

A refining agent that is added for anti-foaming and refining functions will be explained below. Any refining agent can be used so long as it can be used for general optical glasses. Examples of the refining agent include $Sb_2O_3$ and $As_2O_3$. The amount of $Sb_2O_3$ based on the total amount of the glass components is preferably 0 to 1%, more preferably 0 to 0.9%. The amount of $As_2O_3$ based on the total amount of the glass components is also preferably 0 to 1%, more preferably 0 to 0.9%. When $Sb_2O_3$ and $As_2O_3$ are used in combination, the total amount of these is preferably 0 to 1%, more preferably 0 to 0.9%. The above refining agent is added for producing a refining effect or producing an effect on decreasing the coloring of the glass, and when a large amount thereof is introduced, it may oxidize and damage the molding surface of a press mold during precision press-molding, so that the amount thereof is limited to the above extent. In view of toxicity, $As_2O_3$ should be precluded. It is therefore preferred to use $Sb_2O_3$ as a refining agent.

In addition, while PbO is introduced into a conventional high-refractivity glass having the low-temperature softening property, it is required to preclude PbO from the glass of the present invention. The reason therefor is that PbO has toxicity. Another reason is that the following disadvantage is to be overcome. When precision press-molding is carried out in a non-oxidizing atmosphere for preventing damage caused on the molding surface of a press mold by oxidation, PbO is reduced to deposit Pb, and Pb adheres to the above molding surface or soils the surface of an optical element.

Further, when coloring is not intended, it is required to elements that constitute colorants, such as Cr, Cd, Cu, Fe, Co, V, and the like.

For obtaining the predetermined optical constants, it is preferred to preclude F (fluorine), and the like.

The glass transition temperature (Tg), sag temperature (Ts), liquidus temperature (LT) and transmittance property of the optical glass of the present invention will be explained below.

From the viewpoint of precision press-moldability, the glass transition temperature (Tg) of the glass of the present invention is preferably 540° C. or lower, more preferably 530° C. or lower, still more preferably 500° C. or lower.

Similarly, from the viewpoint of precision press-moldability, the sag temperature (Ts) of the glass of the present invention is preferably 570° C. or lower, more preferably 550° C. or lower, still more preferably 540° C. or lower.

For shaping a glass in a molten state without causing it to devitrify, particularly for carrying out hot performing shaping, the liquidus temperature (LT) of the glass of the present invention is preferably less than 970° C., more preferably 950° C. or lower, still more preferably 930° C. or lower.

The optical glass of the present invention is suitable as a glass for precision press-molding, while it is also excellent as a glass material that is used for making an optical element by grinding and polishing.

Owing to the above glass composition, high-refractivity and high-dispersion properties can be imparted, and at the same time, it is made easier to attain a viscosity of 2 dPa·s or higher at a liquidus temperature ("liquidus viscosity" hereinafter). When the liquidus viscosity is adjusted to 2 dPa·s or higher, a molten glass can be caused to flow out in a temperature range in which the glass is not devitrified, a molten glass gob having a weight equivalent to the weight of a precision press-molding preform can be separated without using any cutting blade, and the molten glass gob can be shaped into a preform while it is caused to float by applying air (gas) pressure. The above liquidus viscosity is preferably 2 to 20 dPa·s.

Further, the glass is improved in stability due to the introduction of $SiO_2$, and the above liquidus viscosity is attained also, so that the shaping of the glass, particularly, the hot shaping of a precision press-molding preform can be excellently carried out.

The optical glass I and the optical glass II preferably include optical glasses containing, as an essential component, at least one component selected from $Nb_2O_5$, $WO_3$, $TiO_2$ or $Bi_2O_3$, such as an optical glass containing $P_2O_5$, $SiO_2$, an alkali metal oxide and $Nb_2O_5$ (this expression means that these glass components are co-present, and will be used in this sense hereinafter), an optical glass containing $P_2O_5$, $SiO_2$, an alkali metal oxide and $WO_3$, an optical glass containing $P_2O_5$, $SiO_2$, an alkali metal oxide, $Nb_2O_5$ and $TiO_2$, an optical glass containing $P_2O_5$, $SiO_2$, an alkali metal oxide, $Nb_2O_5$ and $Bi_2O_3$, an optical glass containing $P_2O_5$, $SiO_2$, an alkali metal oxide, $Nb_2O_5$, $WO_3$ and $TiO_2$, an optical glass containing $P_2O_5$, $SiO_2$, an alkali metal oxide, $Nb_2O_5$, $WO_3$ and $Bi_2O_3$, an optical glass containing $P_2O_5$, $SiO_2$, an alkali metal oxide, $Nb_2O_5$, $WO_3$, $TiO_2$ and $Bi_2O_3$, an optical glass containing $P_2O_5$, $SiO_2$, an alkali metal oxide, $Nb_2O_5$, $TiO_2$ and $Bi_2O_3$, and an optical glass that is the same as any one of the above optical glasses except that it further contains $B_2O_3$ as an optional component. While functions of $Nb_2O_5$, $WO_3$, $TiO_2$ and $Bi_2O_3$ will be explained later, these components are all excellent in imparting the glass with high-refractivity and high-dispersion properties.

As an alkali metal oxide, it is sufficient to use at least $Li_2O$. It is preferred to use $Li_2O$ only, $Li_2O$ and $Na_2O$ in combination, $Li_2O$ and $K_2O$ in combination or $Li_2O$, $Na_2O$ and $K_2O$ in combination. As compared with $Na_2O$ and $K_2O$, $Li_2O$ works to decrease the glass transition temperature and sag temperature when introduced in a small amount, so that $Li_2O$ is used as an essential component for imparting the glass with excellent precision press-moldability.

[Process for Producing Optical Glass]

The process for producing an optical glass will be explained below. The process for producing an optical glass, provided by the present invention is a process for producing an optical glass containing $P_2O_5$ and $SiO_2$ as glass components, which comprises either heating and melting a first raw material containing $SiO_2$ to make a melt, or preparing a cullet raw material from said melt, mixing a second raw material containing a phosphoric acid compound, a melt obtained by heating and melting said second raw material or a cullet raw material obtained from said melt of the second raw material with said melt of the first raw material or the cullet raw material obtained from said melt of the first raw material, melting the mixture and melting said optical glass.

When an attempt is made to heat and melt a silica raw material and a phosphoric acid compound together, it is difficult to melt them at a practical-level temperature. When the heating temperature is further increased for promoting the melting, a platinum crucible is corroded, and as a result, not only the lifetime of the crucible is decreased, but also platinum is melted into the glass to result in the coloring of the glass. Further, when the melting is carried out in a reducing atmosphere for preventing damage to the platinum crucible, high-refracting-imparting components such as $Nb_2O_5$, $TiO_2$, $WO_3$, etc., are reduced to color the glass. For overcoming the above problems, the $SiO_2$ raw material and the phosphoric acid compound are melted separately, and then these are heated and melted to make a homogeneous molten glass for the glass as an end product.

In the present invention, glass raw materials for use are classified as follows.

A group 1 includes a raw material for introducing $SiO_2$ as an essential component, and there is $SiO_2$ as an example.

A group 2 includes raw materials that easily form a homogeneous glass when heated and melted together with the raw material of the group 1. Examples of the raw materials of the group 2 include $B_2O_3$, $H_3BO_3$, $Al_2O_3$, $Na_2CO_3$, $NaNO_3$, $K_2CO_3$, $KNO_3$, $BaCO_3$, $Ba(NO_3)_2$, $TiO_2$, $Nb_2O_5$, etc.

A group 3 includes raw materials that easily decrease the melting temperature when mixed with the raw material of the group 1. However, the group 3 also includes those that cannot always serve to form a glass. The group 3 includes $B_2O_3$, $H_3BO_3$, $Li_2CO_3$, $LiNO_3$, $Na_2CO_3$, $NaNO_3$, $K_2CO_3$, $KNO_3$, $BaCO_3$, $Ba(NO_3)_2$, $WO_3$, $Bi_2O_3$, $ZnO$, etc.

A group 4 includes raw materials that are also included in the groups 2 and 3.

A group 5 includes raw materials that are used for introducing $P_2O_5$ as a glass component and that are phosphoric acid compounds. The raw materials coming under the group 5 have difficulty in forming a homogeneous glass with the raw material included in the group 1, and when raw materials of these two groups are mixed, no decrease in the melting temperature is found. The group 5 includes $H_3PO_4$, $BPO_4$, $Al(PO_3)_3$, $LiPO_3$, $NaPO_3$, $Na_3PO_4$, $Na_5P_3O_{10}$, $KPO_3$, $Mg(PO_3)_2$, $Ca(PO_3)_2$, $Sr(PO_3)_2$, $Ba(PO_3)_2$, $Zn(PO_3)_2$, etc.

In addition to these, there are raw materials that are included in the group 2 but are not included in the group 3 (such as $Al_2O_3$, $TiO_2$, $Nb_2O_5$, etc., group 6) and raw materials that are included in the group 3 but are not included in the group 2 (such as $WO_3$, $Bi_2O_3$, $Li_2CO_3$, $LiNO_3$, $ZnO$, etc., group 7).

In a first method in the present invention, the raw materials of the groups 1 and 4 are melted under heat to prepare a melt. Then, the raw material included in the group 5 is added to the above melt, to prepare a molten glass containing $SiO_2$ and $P_2O_5$, and the molten glass is shaped and cooled to obtain an optical glass.

In a second method, the raw materials of the groups 1 and 4 are melted under heat to prepare a molten glass, and the molten glass is cooled to prepare a cullet raw material. Then, the above cullet raw material and the raw material included in the group 5 are melted under heat to prepare a molten glass containing $SiO_2$ and $P_2O_5$, and the molten glass is shaped and cooled to obtain an optical glass.

In a third method, the raw materials of the groups 1 and 4 are melted under heat to prepare a molten glass, and the molten glass is cooled to prepare a cullet raw material. Then, the raw material included in the group 5 is melted under heat to prepare a molten glass, and the molten glass is cooled to prepare a cullet raw material. A raw material containing the above two cullet raw materials is melted under heat to prepare a molten glass containing $SiO_2$ and $P_2O_5$ and the molten glass is shaped and cooled to obtain an optical glass.

In a fourth method, the raw material included in the group 5 is melted under heat to prepare a molten glass, and the molten glass is cooled to prepare a cullet raw material. The cullet raw material is added to a melt prepared by heating and melting the raw materials of the groups 1 and 4, the mixture is melted under heat to prepare a molten glass containing $SiO_2$ and $P_2O_5$, and the molten glass is shaped and cooled to obtain an optical glass.

In a fifth method, the raw materials of the groups 1 and 4 are melted under heat to prepare a melt. The raw material included in the group 5 is melted under heat to prepare a melt. The above melt is mixed with this melt and heated to prepare a molten glass containing $SiO_2$ and $P_2O_5$, and the molten glass is shaped and cooled to obtain an optical glass.

When the raw materials of the groups 1 and 4 are melted under heat, the raw material of the group 6 or 7 may be added. Further, when the raw material of the group S is melted under heat, the raw material of the group 2, 3 or 4 may be combined.

The above method is preferably applied to a glass in which the sum total of the total amount of the alkali metal oxide(s) and the amount of $B_2O_3$ is less than 20% by weight, more preferably applied to a glass of which the above sum total is less than 17% by weight, and still more preferably applied to a glass of which the above sum total is less than 15% by weight. As an alkali metal oxide, $Li_2O$, $Na_2O$ are $K_2O$ used alone or in combination. In such a glass, the amount of components such as an alkali metal oxide, $B_2O_3$, etc., for improving the glass in meltability is small, so that it is difficult to completely melt the $SiO_2$ raw material at a practical-level heating temperature, and when an attempt is made to obtain a homogeneous optical glass, the glass is greatly degraded in quality due to the above problem. However, when the above method is applied, a high-quality optical glass can be produced.

Further, the above method is suitable for producing a glass containing $Nb_2O_5$, $WO_3$, $TiO_2$ and $Bi_2O_3$ in a total amount of 25 to 45 mol %. The amount of $P_2O_5$ as a component for forming a glass network structure has a lower limit for maintaining the stability of the glass, and when the amount ratio of $Nb_2O_5$, $WO_3$, $TiO_2$ and $Bi_2O_3$ is increased, the amount of the alkali metal oxide(s), $B_2O_3$, etc., for improving the glass in meltability decreases. As a result, the meltability is decreased. In such a glass, however, $SiO_2$ is introduced by the above process, and a high-quality optical glass can be accordingly produced.

Further, the above method is suitable for producing a glass having an Abbe's number (vd) of 30 or less. For imparting a glass with the above high dispersion property, it is required to increase the amount of component(s) for imparting the high dispersion property, such as $Nb_2O_5$, $WO_3$, $TiO_2$, $Bi_2O_3$, and the like. Further, the amount of $P_2O_5$ has a lower limit for maintaining the stability of the glass, so that the amount of the alkali metal oxide(s), $B_2O_3$, etc., for improving the glass in meltability decreases. According to the above method, a high-quality optical glass can be produced even if the glass has an Abbe's number (vd) of 30 or less, contains $P_2O_5$ and $SiO_2$ and has low meltability.

The above method is also suitable for producing a glass having a refractive index (nd) of 1.70 or more, preferably 1.82 or more. Components for imparting a glass with the high dispersion property, such as $Nb_2O_5$, $WO_3$, $TiO_2$, $Bi_2O_3$, etc., are also components for imparting the glass with high refractivity, so that the meltability of the glass is liable to decrease like a high-dispersion glass. According to the above method, however, a high-quality optical glass can be produced even if the glass has a refractive index (nd) of 1.70 or more, contains $P_2O_5$ and $SiO_2$ and has low meltability.

Further, the above method is suitable for producing a glass containing 0.5 mol % or more of $SiO_2$. When the content of $SiO_2$ that is poorly compatible with the phosphoric acid compound come to be 0.5 mol % or more, a glass is greatly degraded in meltability. According to the above method, however, a homogeneous and high-quality optical glass can be produced. In the above method, it is preferred to limit the content of $SiO_2$ to 4 mol % or less for obtaining a homogeneous glass having high-refractivity and high-dispersion properties. The introduction of approximately 0.5 to 4 mol % of $SiO_2$ is more effective for improving the glass in stability, liquidus viscosity and coloring degree.

Further, the above method is suitable for producing the optical glass of the present invention.

In the above glass production method, a known melting technique can be applied, as required, to those points which are not specified.

[Precision Press-Molding Preform]

The precision press-molding preform (to be referred to as "preform" hereinafter) of the present invention will be explained below. The preform refers to a glass shaped material that is pre-shaped before precision press-molding so as to have a form suitable for the precision press-molding, and it has a weight equivalent to the weight of a precision press-molded product and has a smooth surface free of defects such as scratches, and the like. In the precision press-molding, the surface of a preform is highly possibly formed into the optical-function surface of an optical element as it is, and it is required to have not only a high internal product quality but also a high surface quality.

(Preform I)

A first preform of the present invention (to be referred to as "preform I" hereinafter) is formed of the above glass of the present invention. The preform I therefore has various properties that the glass of the present invention has.

The preform I is preferably a preform of which the entire surface is formed in a manner in which the above glass in a molten state is solidified. Further, preferably, the entire surface of the preform is formed of a free surface. The free surface refers to a surface that is formed without contacting any solid in the process of a glass in a molten state being cooled so that no surface of the above solid is transferred to the surface of the glass. Since the entire surface of each of such preforms is smooth and is also free of any fine polishing mark, optical elements having an excellent surface each can be highly productively produced by precision press-molding.

(Preform II)

A second preform of the present invention (to be referred to as "preform II" hereinafter) is a preform that is formed of an optical glass containing $P_2O_5$, $SiO_2$ and an alkali metal oxide as essential components, having an $SiO_2$ content of 0.5 to 4 mol % and having a refractive index (nd) of 1.80 or more and an Abbe's number (vd) of 30 or less, and of which the entire surface is formed in a manner in which the above glass in a molten state is solidified.

(Preform III)

A third preform of the present invention (to be referred to as "preform III" hereinafter) is a preform that is formed of an optical glass containing $P_2O_5$, $SiO_2$ and an alkali metal oxide as essential components, having an $SiO_2$ content of 0.5 to 4 mol %, having a refractive index (nd) of 1.80 or more and an Abbe's number (vd) of 30 or less and of which the entire surface is formed of a free surface.

In the preforms II and III, effects produced by introducing $P_2O_5$, $SiO_2$ and an alkali metal oxide and the reason for limitation of the content of $SiO_2$ are as explained with regard to the glass of the present invention. Due to the functions and effects of these components, there can be provided a homogeneous and high-quality preform that has the above-described entire surface and that is free of devitrification and striae. Further, the preform has the above-explained surface, so that there can be highly productively produced optical elements formed of a glass having an excellent surface each and having the property of high dispersion.

(Points Common to Preforms II and III)

Points common to the preforms II and III will be explained below. These preforms are preferably formed of a glass having a $Nb_2O_5$, $WO_3$, $TiO_2$ and $Bi_2O_3$ total content of 25 to 45 mol % and having a refractive index (nd) of 1.80 or more, preferably 1.82 or more, still more preferably 1.84 or more.

Further, preferably, $B_2O_3$ is contained as an optional component and the sum total of the total amount of alkali metal oxides and the amount of $B_2O_3$ is less than 20% by weight, more preferably less than 17% by weight, still more preferably 15% by weight.

Further, desirably, the above alkali metal oxide includes $Li_2O$, and each of (1) $Li_2O$, (2) a combination of $Li_2O$ and $Na_2O$ and (3) a combination of $Li_2O$, $Na_2O$ and $K_2O$ is preferred. The above glass may further contain BaO, ZnO, and the like. The content of $Li_2O$ is preferably 2% by weight or more.

For the same reason as that in the glass of the present invention, it is desirable to introduce over 0 mol % of $WO_3$.

The content of each component and the total content of components are preferably adjusted to the ranges explained with regard to the above glass of the present invention, and the refining agent, the amount thereof and the component to be precluded are also preferably arranged as explained with regard to the above glass of the present invention.

The preform of the present invention is particularly preferably any one of a preform that is included in the preform I and the preform II, a preform that is included in the preform I and the preform III and a preform that is included in all of the preforms I to III.

(Points Common to Preforms I to III)

Points common to the preforms I to III will be explained below. The preforms I to III will be referred to as "preform" in the block hereinafter.

The form of the preform is preferably the form of a sphere or a form having one axis of rotation symmetry by taking account of the fact that the preform is to be expanded as isotropically as possible in precision press-molding and that the form of a lens has the axis of rotation symmetry which lens is particularly highly demanded among optical elements to which precision press-molded products are applied. The form having one axis of rotation is preferably as follows.

In a cross section including the above axis of symmetry, a straight line connecting a point on the contour line of a preform and the center of the gravity of the preform and a tangent line contacting the contour line at the above point on the contour line are to be noted. And, preferred is a form in which an angle θ formed by the above straight line and the tangent line changes as follows. That is, the θ is 90° at an intersection point of the axis of rotation symmetry and the contour line, and as the point on the contour line is moved from the intersection point, θ monotonously increases, then comes to decrease monotonously and decreases monotonously again after 90° is reached. Then, θ comes to increase monotonously and comes back to be 90° on the other intersection point of the axis of rotation symmetry and the contour line. In this case, since the preform is a body of rotation, θ exhibits the same behavior as above and comes again to be 90° at the intersection point at the start point. When θ is taken as a supplementary angle to the above θ, the θ exhibits a behavior in a manner in which the monotonous increase and the monotonous decrease are exchanged.

When the preform has the above form, an ambient gas is trapped between the preform and a press mold during precision press-molding, and the risk of gas trapping that causes defective molding can be decreased. For further decreasing the above risk of gas trapping, the preform can be shaped such that the curvature of the preform surface is greater than the curvature of the molding surface of a press mold.

The preform preferably has a weight of 40 mg to 10 g. When the preform has a weight in the above range, a molten glass gob can be shaped into the preform while the glass gob is caused to float by applying air (gas) pressure to the glass gob. As a result, preforms of which the entire surface each is a surface formed in a manner in which a glass in a molten state is solidified, or preforms of which the entire surface is a free surface can be productively produced. Weight ranges preferred depending upon forms will be explained below. When the preform is spherical, the weight of the preform is preferably in the range of 40 to 700 mg, more preferably 100 to 400 mg. When the preform has one axis of rotation symmetry, the weight of the preform is preferably in the range of 300 mg to 10 g.

Further, the weight accuracy based on a predetermined weight is desirably ±2% or smaller, more desirably ±1% or smaller, still more desirably ±0.8% or smaller.

The refractive index (nd), Abbe's number (vd), glass transition temperature (Tg), sag temperature (Ts) and transmittance property of the glass for shaping the preform can be arranged as explained with regard to the glass of the present invention.

[Process for Producing Precision Press-Molding Preform]

The process for producing a precision press-molding preform will be explained below.

A first process for producing a preform (to be referred to "preform production process I" hereinafter), provided by the present invention, comprises separating a molten glass gob having a predetermined weight from an optical glass in a molten state which is produced by the above process for producing an optical glass in the present invention, and shaping the above molten glass gob into a preform having a weight equivalent to the above weight before the molten glass gob is cooled to solidness.

A second process for producing a preform (to be referred to as "preform production process II" hereinafter) comprises separating a molten glass gob having a predetermined weight from a glass in a molten state and shaping the above molten glass gob into any one of the above preforms I to III having a weight equivalent to the above weight before the molten glass gob is cooled to solidness.

In the above preform production processes I and II, preferably, the above molten glass gob is shaped into a preform while the molten glass gob is caused to float by applying air (gas) pressure to the molten glass gob.

Examples of the method of separating the molten glass gob having a predetermined weight from a glass in a molten state include the following methods. The first method is a method in which a molten glass flow that is flowing out of a flow pipe at a constant flow rate is dropped. In this method, when the weight exerting on a glass comes to be greater than the force that causes a molten glass to stay on the forward end of the above pipe, a glass drop having a predetermined weight comes down from the forward end of the pipe. The flowing glass dropwise comes down at a constant cycle to give molten glass gobs having a predetermined weight each one after another. In this method, further, a constant downward air (gas) pressure may be applied to a molten glass that appears on the forward end of the flow pipe. In this case, glass drops having a smaller weight than that obtained without applying the air (gas) pressure can be caused to drop.

A second method is a method in which the forward end of a molten glass flow that is flowing out of a flow pipe at a constant flow rate is supported, a narrow portion is formed between the forward end of the molten glass flow and the pipe side portion of the molten glass flow on the basis of a surface tension, and the above support is removed timely as predetermined, to separate a molten glass gob formed of a glass from the narrow portion to the forward end side. In this method, a molten glass gob having a larger weight than that in the first method can be separated.

A preform, which is shaped by causing a glass gob separated without using any cutting blade float as described above has a smooth surface free of a cutting mark and is suitable as a precision press-molding preform.

The surface of the preform may be provided with a mold release film for improving the lubricity between the preform surface and the molding surface of a press mold during precision press-molding and improving releasability after the precision press-molding. Examples of the above mold release film include carbon-containing films such as a carbon deposition film and carbon film formed by CVD. Preferably, the mold release film is formed on that surface of the preform which comes in contact with a press mold or on the entire surface of the preform.

[Optical Element]

The optical element of the present invention will be explained below.

A first optical element (to be referred to as "optical element I" hereinafter) of the present invention is a precision press-molded product and is characteristically formed of any one of the above glasses I and II.

A second optical element (to be referred to as "optical element II" hereinafter) is an optical element obtained by precision press-molding any one of the preforms I to III or a preform produced by the preform production process I or II.

The above optical element includes, for example, various lenses such as an aspherical lens, a spherical lens, a microlens, etc., a lens array, a diffraction grating, a lens with a diffraction grating, a prism, a prism imparted with a lens function on its surface, a filter, and the like, although the optical element shall not be limited thereto. The form of the various lenses includes the forms of a double-convex lens, a double-concave lens, a planoconvex lens, a planoconcave lens, a convex meniscus lens, a concave meniscus lens, a cylindrical lens, etc., and from the viewpoint of functions, the optical element includes a lens for an image-sensing system, an optical pickup lens, a collimator lens, an optical communication lens, and the like. However, the optical element shall not be limited thereto.

An optical multi-layered film such as an anti-reflection film, a partial reflection film, a reflection film, a wavelength-dependent reflection film, a wavelength-dependent light absorption film, or the like may be formed on the surfaces of the above various optical elements.

[Process for Producing Optical Element]

The process for producing an optical element, provided by the present invention, will be explained below.

A first process for producing an optical element (to be referred to as "optical element production process I" hereinafter) comprises heating and precision press-molding a precision press-molding preform to produce an optical element formed of any one of the optical glasses I and II.

A second process for producing an optical element (to be referred to as "optical element production process II" hereinafter) comprises the step of heating and precision press-molding any one of the preforms I to III or a preform produced by the preform production process I.

Each of the optical element production processes I and II can employ any one of the method of introducing a preform into a press mold and heating the preform and the press mold together (to be referred to as "method A" hereinafter) and the method of introducing a preform heated into a press mold and precision press-molding the preform (to be referred to as "method B" hereinafter).

EXAMPLES

The present invention will be explained further in detail with reference to Examples hereinafter, while the present invention shall not be limited by these Examples.

Examples 1-13

(1) Raw materials were weighed for obtaining glasses having compositions shown in Tables 1 to 3 to prepare raw material mixtures containing silica raw materials and raw material mixture containing phosphoric acid compounds. Raw materials (raw material 1" hereinafter) that were mixed with the silica raw material were $H_3BO_3$, $K_2CO_3$ and $BaCO_3$, and the raw material mixtures containing silica raw materials introduced $SiO_2$, $B_2O_3$, $K_2O$ and BaO as glass components into glasses. On the other hand, raw materials ("raw material 2" hereinafter) containing phosphoric acid compounds were prepared by mixing $Zn(PO_3)_2$, $LiPO_3$, $NaPO_3$, $TiO_2$, $Nb_2O_5$, $WO_3$ and $Bi_2O_3$.

The raw material 1 was placed in a platinum crucible, and in an electric furnace, it was heated, melted and stirred in atmosphere at 1,050 to 1,200° C. for 10 to 60 minutes, to give a melt. Then, the raw material 2 was added to the above melt, and the resulting mixture was heated, melted, refined and stirred in atmosphere at 1,050 to 1,150° C. for 1.5 to 2.5 hours, to give a homogeneous molten glass. A quartz crucible may be used for melting the above glasses.

Then, the above molten glass was cast into a 40×70×15 mm mold (die) made of carbon and gradually cooled to the glass transition temperature, and immediately thereafter, the glass was placed in an annealing furnace, annealed at a temperature around the transition temperature for 1 hour and gradually cooled to room temperature in the annealing furnace, to give an optical glass. In this manner, optical glasses in Examples 1 to 13 were obtained. When each of the thus-obtained glasses was visually enlarged and observed through a microscope, neither crystal precipitation nor a non-melted raw material was observed.

Tables 1 to 3 show refractive indexes (nd), Abbe's numbers (νd), glass transition temperatures (Tg), sag temperatures (Ts), liquidus temperatures (LT), liquidus viscosities, λ80, λ70, λ5 and specific gravities together with compositions with regard to the glasses obtained. Measurements for properties were made as follows.

(a) Refractive Index (nd) and Abbe's Number (νd)

Optical glasses obtained at a gradually cooling temperature decrease rate of −30° C./hour were measured.

(b) Glass Transition Temperature (Tg) and Sag Temperature (Ts)

Measured with an apparatus for thermomechanical analysis supplied by Rigaku Corporation at a temperature elevation rate of 4° C./minute.

(c) Liquidus Temperature (L.T.)

50 g of a glass sample was placed in a platinum crucible and melted at approximately 1,100 to 1,200° C. for approximately 15 to 60 minutes. Then, one glass sample was held at 880° C., another, at 890° C., still another, at 900° C. and yet another, at 910° C. for 2 hours each, and these glass samples were cooled and observed through a microscope for a presence or absence of crystal precipitation. A lowest temperature at which no crystal was observed was taken as a liquidus temperature (L.T.).

(d) Liquidus Viscosity

Measured for a viscosity at a liquidus temperature of a glass according to a rotating cylinder method based on "JIS Z 8803-1991 'Method of measuring liquid for viscosity' 8. Viscosity measurement with single cylindrical rotation viscometer".

(e) Specific Gravity

Measured by an Archimedean method.

TABLE 1

|  |  | Example | | | | | | | | | |
|---|---|---|---|---|---|---|---|---|---|---|---|
|  |  | 1 | | 2 | | 3 | | 4 | | 5 | |
|  |  | mol % | wt % | mol % | wt % | mol % | wt % | mol % | wt % | mol % | wt % |
| Composition | $P_2O_5$ | 24.0 | 24.1 | 24.0 | 24.1 | 23.0 | 23.2 | 23.0 | 23.4 | 23.0 | 23.6 |
|  | $B_2O_3$ | 5.0 | 2.5 | 4.0 | 2.0 | 6.0 | 3.0 | 5.0 | 2.5 | 6.0 | 3.0 |
|  | $SiO_2$ | 1.0 | 0.4 | 2.0 | 0.8 | 1.0 | 0.4 | 2.0 | 0.9 | 1.0 | 0.4 |
|  | $Li_2O$ | 21.0 | 4.4 | 21.0 | 4.4 | 21.0 | 4.5 | 21.0 | 4.5 | 21.0 | 4.5 |
|  | $Na_2O$ | 12.0 | 5.3 | 12.0 | 5.3 | 12.0 | 5.3 | 12.0 | 5.3 | 12.0 | 5.4 |
|  | $K_2O$ | 2.0 | 1.3 | 2.0 | 1.3 | 2.0 | 1.3 | 2.0 | 1.4 | 2.0 | 1.4 |
|  | BaO | 1.0 | 1.1 | 1.0 | 1.1 | 1.0 | 1.1 | 1.5 | 1.6 | 1.5 | 1.7 |
|  | ZnO | 0.0 | 0.0 | 0.0 | 0.0 | 0.0 | 0.0 | 0.0 | 0.0 | 1.0 | 0.6 |
|  | $TiO_2$ | 5.5 | 3.1 | 5.5 | 3.1 | 5.5 | 3.1 | 6.0 | 3.4 | 6.0 | 3.5 |
|  | $Nb_2O_5$ | 19.0 | 35.7 | 19.0 | 35.7 | 19.0 | 35.9 | 18.5 | 35.3 | 19.0 | 36.5 |
|  | $Bi_2O_3$ | 4.0 | 13.2 | 4.0 | 13.2 | 4.0 | 13.2 | 4.0 | 13.4 | 4.0 | 13.5 |
|  | $WO_3$ | 5.5 | 9.0 | 5.5 | 9.0 | 5.5 | 9.1 | 5.0 | 8.3 | 3.5 | 5.9 |
|  | Total | 100 | 100 | 100 | 100 | 100 | 100 | 100 | 100 | 100 | 100 |
|  | $Li_2O/(Li_2O + Na_2O + K_2O)$ [molar ratio] | 0.600 | | 0.600 | | 0.600 | | 0.600 | | 0.600 | |
| Properties | Tg [° C.] | 457 | | 460 | | 456 | | 458 | | 460 | |
|  | Ts [° C.] | 509 | | 511 | | 504 | | 509 | | 508 | |
|  | LT [° C.] | 890 | | 890 | | 890 | | 890 | | 910 | |
|  | LT viscosity [dPa · s] | 5 | | 5 | | 4 | | 4 | | 3 | |
|  | Specific gravity | 3.81 | | 3.81 | | 3.82 | | 3.81 | | 3.78 | |
|  | Nd | 1.85101 | | 1.85117 | | 1.85385 | | 1.85003 | | 1.84974 | |
|  | νd | 22.9 | | 22.9 | | 22.8 | | 23.0 | | 23.1 | |
|  | λ 5 [nm] | 379 | | 379 | | 379 | | 380 | | 379 | |

TABLE 1-continued

| | | Example | | | | | | | | |
|---|---|---|---|---|---|---|---|---|---|---|
| | | 1 | | 2 | | 3 | | 4 | | 5 |
| | | mol % | wt % | mol % | wt % | mol % | wt % | mol % | wt % | mol % | wt % |
| | λ 70 [nm] | | 435 | | 439 | | 442 | | 469 | | 460 |
| | λ 80 [nm] | | 520 | | 532 | | 531 | | 564 | | 545 |

TABLE 2

| | | Example | | | | | | | | |
|---|---|---|---|---|---|---|---|---|---|---|
| | | 6 | | 7 | | 8 | | 9 | | 10 |
| | | mol % | wt % | mol % | wt % | mol % | wt % | mol % | wt % | mol % | wt % |
| Composition | $P_2O_5$ | 23.0 | 23.5 | 23.0 | 23.3 | 23.0 | 23.6 | 23.0 | 23.2 | 23.0 | 23.2 |
| | $B_2O_3$ | 6.0 | 3.0 | 5.0 | 2.5 | 5.0 | 2.5 | 5.0 | 2.5 | 5.0 | 2.5 |
| | $SiO_2$ | 1.0 | 0.4 | 2.0 | 0.9 | 2.0 | 0.9 | 2.0 | 0.9 | 2.0 | 0.9 |
| | $Li_2O$ | 21.0 | 4.5 | 21.0 | 4.5 | 22.0 | 4.8 | 21.0 | 4.5 | 21.5 | 4.6 |
| | $Na_2O$ | 12.0 | 5.4 | 12.0 | 5.3 | 12.0 | 5.4 | 12.0 | 5.3 | 11.5 | 5.1 |
| | $K_2O$ | 2.0 | 1.4 | 2.0 | 1.3 | 2.0 | 1.4 | 2.0 | 1.3 | 2.0 | 1.3 |
| | BaO | 1.0 | 1.1 | 1.5 | 1.6 | 0.5 | 0.6 | 1.0 | 1.1 | 1.5 | 1.6 |
| | ZnO | 0.0 | 0.0 | 0.0 | 0.0 | 0.0 | 0.0 | 0.5 | 0.3 | 0.0 | 0.0 |
| | $TiO_2$ | 6.5 | 3.7 | 5.5 | 3.1 | 6.5 | 3.5 | 5.0 | 2.8 | 5.0 | 2.8 |
| | $Nb_2O_5$ | 18.0 | 34.4 | 18.5 | 35.1 | 18.5 | 35.6 | 18.5 | 35.0 | 18.5 | 34.9 |
| | $Bi_2O_3$ | 4.0 | 13.4 | 4.0 | 13.3 | 4.0 | 13.5 | 4.0 | 13.3 | 4.0 | 13.2 |
| | $WO_3$ | 5.5 | 9.2 | 5.5 | 9.1 | 5.0 | 8.4 | 6.0 | 9.9 | 6.0 | 9.9 |
| | Total | 100 | 100 | 100 | 100 | 100 | 100 | 100 | 100 | 100 | 100 |
| | $Li_2O/(Li_2O + Na_2O + K_2O)$ [molar ratio] | 0.600 | | 0.600 | | 0.611 | | 0.600 | | 0.614 | |
| Properties | Tg [° C.] | | 463 | | 460 | | 457 | | 455 | | 461 |
| | Ts [° C.] | | 514 | | 510 | | 514 | | 504 | | 512 |
| | LT [° C.] | | 890 | | 890 | | 890 | | 900 | | 890 |
| | LT viscosity [dPa·s] | | 5 | | 4 | | 4 | | 4 | | 4 |
| | Specific gravity | | 3.81 | | 3.82 | | 3.78 | | 3.83 | | 3.83 |
| | Nd | | 1.85013 | | 1.84933 | | 1.84865 | | 1.84865 | | 1.84940 |
| | ν d | | 22.9 | | 23.1 | | 23.0 | | 23.1 | | 23.1 |
| | λ 5 [nm] | | 381 | | 380 | | 379 | | 379 | | 378 |
| | λ 70 [nm] | | 460 | | 467 | | 448 | | 444 | | 432 |
| | λ 80 [nm] | | 549 | | 530 | | 540 | | 535 | | 531 |

TABLE 3

| | | Example | | | | | |
|---|---|---|---|---|---|---|---|
| | | 11 | | 12 | | 13 | |
| | | mol % | wt % | mol % | wt % | mol % | wt % |
| Composition | $P_2O_5$ | 23.0 | 23.4 | 23.0 | 23.3 | 23.0 | 23.4 |
| | $B_2O_3$ | 7.0 | 3.5 | 6.0 | 3.0 | 6.0 | 3.0 |
| | $SiO_2$ | 1.0 | 0.4 | 1.0 | 0.4 | 1.0 | 0.4 |
| | $Li_2O$ | 22.0 | 4.7 | 21.0 | 4.5 | 21.0 | 4.5 |
| | $Na_2O$ | 11.0 | 4.9 | 12.0 | 5.3 | 12.0 | 5.3 |
| | $K_2O$ | 2.0 | 1.3 | 2.0 | 1.3 | 2.0 | 1.4 |
| | BaO | 0.0 | 0.0 | 2.0 | 2.2 | 1.5 | 1.6 |
| | ZnO | 0.0 | 0.0 | 0.0 | 0.0 | 0.0 | 0.0 |
| | $TiO_2$ | 5.5 | 3.1 | 5.5 | 3.1 | 6.0 | 3.4 |
| | $Nb_2O_5$ | 19.0 | 36.2 | 19.0 | 36.1 | 18.5 | 35.2 |
| | $Bi_2O_3$ | 4.0 | 13.3 | 4.0 | 13.3 | 4.0 | 13.4 |
| | $WO_3$ | 5.5 | 9.1 | 4.5 | 7.4 | 5.0 | 8.3 |
| | Total | 100 | 100 | 100 | 100 | 100 | 100 |
| | $Li_2O/(Li_2O + Na_2O + K_2O)$ [molar ratio] | 0.629 | | 0.600 | | 0.600 | |
| Properties | Tg [° C.] | | 454 | | 456 | | 451 |
| | Ts [° C.] | | 503 | | 506 | | 498 |
| | LT [° C.] | | 900 | | 900 | | 890 |
| | LT viscosity | | 4 | | 4 | | 4 |

TABLE 3-continued

| | Example | | | | | |
|---|---|---|---|---|---|---|
| | 11 | | 12 | | 13 | |
| | mol % | wt % | mol % | wt % | mol % | wt % |
| [dPa·s] | | | | | | |
| Specific gravity | 3.78 | | 3.80 | | 3.80 | |
| Nd | 1.85337 | | 1.84995 | | 1.84992 | |
| νd | 22.8 | | 23.1 | | 23.0 | |
| λ5 [nm] | 379 | | 378 | | 378 | |
| λ70 [nm] | 444 | | 438 | | 438 | |
| λ80 [nm] | 538 | | 521 | | 522 | |

(2) Then, the above molten glass refined and homogenized was caused to flow, at a constant rate, out of a pipe made of a platinum alloy that was temperature-adjusted to a temperature region capable of causing the glass to flow out without any devitrification, and a molten glass gob having the weight of an intended preform was separated by a dropping method or a descent-separation method, received with a receiving mold provided with a gas ejection port in the bottom thereof and shaped into a precision press-molding preform while the glass gob was caused to float and rotate by ejecting a gas from the gas ejection port. The intervals for separating the molten glass were adjusted and set for obtaining spherical preforms having a diameter of 2 to 30 mm. The thus-obtained preforms had weights that were precisely in agreement with set values, and all of them had smooth surfaces. The form of such a preform is not limited to a sphere, and the glass gob can be shaped in the form of a low-profile sphere, or the like.

(3) The thus-obtained preforms were precision press-molded with a press machine shown in FIG. 1 to give aspherical lenses. Specifically, a preform 4 was placed between a lower mold member 2 and an upper mold member 1 constituting a press mold, a nitrogen atmosphere was introduced into a quartz tube 11, and a heater 12 was electrically powered to heat the inside of the quartz tube 11. The temperature inside the press mold was set at a temperature at which the glass exhibited a viscosity of $10^8$ to $10^{10}$ dPa·s, and while this temperature was maintained, a pressing rod 13 was moved downward to press the upper mold member 1, so that the preform 4 set in the press mold was pressed. The pressure for the pressing was set at 8 MPa, and the time period for the pressing was adjusted to 30 seconds. After the pressing, the pressure for the pressing was removed, and in a state where a glass molded product obtained by the press-molding was in contact with the lower mold member 2 and the upper mold member 1, the glass molded product was gradually cooled to a temperature at which the above glass had a viscosity of $10^{12}$ dPa·s or more. Then, the glass molded product was rapidly cooled to room temperature and taken out of the press mold to give an aspherical lens. Aspherical lenses obtained in the above manner were lenses having remarkably high surface accuracy. As the above press mold, there was used a press mold that was formed of SiC and that had a molding surface provided with a carbon-containing mold release film. In FIG. 1, numeral 3 indicates a sleeve mold member, numeral 9 indicates a support rod, numeral 10 indicates a support platform, and numeral 14 indicates a thermocouple.

The aspherical lenses obtained by the precision press-molding may be provided with an anti-reflection film each as required.

Similar preforms were precision press-molded according to other method. In this method, while a preform is caused to float, the preform is preheated to a temperature at which the glass constituting the preform has a viscosity of $10^8$ dPa·s. Separately, a press mold that is formed of SiC, that has a molding surface provided with a carbon-containing film and that has an upper mold member, a lower mold member and a sleeve member is heated up to a temperature at which the above glass exhibits a viscosity of $10^9$ to $10^{12}$ dPa·s, and the preheated preform is introduced into the press mold to carry out precision press-molding. The pressure for the pressing was set at 10 MPa. Upon start of the pressing, the cooling of the press mold was started, the cooling was continued until the molded glass had a viscosity of $10^{12}$ dPa·s or more, and a molded product was taken out of the mold to give an aspherical lens. Aspherical lenses obtained in the above manner had remarkably high surface accuracy.

An aspherical lenses obtained by the precision press-molding may be provided with an antireflection film as required.

In the above manner, high-quality optical elements formed of a glass were highly productively and highly precisely produced.

Comparative Examples 1 and 2

Raw materials were prepared for obtaining glasses having compositions shown in Table 4, and optical glasses were produced as follows.

Raw material 1 and raw material 2 were mixed, and attempts were made to melt each mixture under the same conditions as those in Examples 1 to 13. In Comparative Examples 1 and 2, however, the mixtures were not homogenized, and no optical glasses were obtained.

TABLE 4

| | | Comparative Example | | | |
|---|---|---|---|---|---|
| | | 1 | | 2 | |
| | | mol % | wt % | mol % | wt % |
| Composition | $P_2O_5$ | 24.0 | 24.1 | 24.0 | 24.1 |
| | $B_2O_3$ | 5.0 | 2.5 | 4.0 | 2.0 |
| | $SiO_2$ | 1.0 | 0.4 | 2.0 | 0.8 |
| | $Li_2O$ | 21.0 | 4.4 | 21.0 | 4.4 |
| | $Na_2O$ | 12.0 | 5.3 | 12.0 | 5.3 |
| | $K_2O$ | 2.0 | 1.3 | 2.0 | 1.3 |
| | BaO | 1.0 | 1.1 | 1.0 | 1.1 |
| | ZnO | 0.0 | 0.0 | 0.0 | 0.0 |
| | $TiO_2$ | 5.5 | 3.1 | 5.5 | 3.1 |
| | $Nb_2O_5$ | 19.0 | 35.7 | 19.0 | 35.7 |
| | $Bi_2O_3$ | 4.0 | 13.2 | 4.0 | 13.2 |
| | $WO_3$ | 5.5 | 9.0 | 5.5 | 9.0 |
| Total | | 100 | 100 | 100 | 100 |
| $Li_2O/(Li_2O +$ $Na_2O + K_2O)$ [molar ratio] | | 0.600 | | 0.600 | |

TABLE 4-continued

| | | Comparative Example | | | |
|---|---|---|---|---|---|
| | | 1 | | 2 | |
| | | mol % | wt % | mol % | wt % |
| Properties | Tg [° C.] | Not homogenized | | Not homogenized | |
| | Ts [° C.] | | | | |
| | LT [° C.] | | | | |
| | LT viscosity [dPa·s] | | | | |
| | Specific gravity | | | | |
| | Nd | | | | |
| | νd | | | | |
| | λ 5 [nm] | | | | |
| | λ 70 [nm] | | | | |
| | λ 80 [nm] | | | | |

INDUSTRIAL UTILITY

The optical glass of the present invention is a phosphate-containing optical glass having highly useful optical properties such as high-refractivity and high-dispersion properties, and has high stability while maintaining precision press-moldability. The optical elements formed of the above optical glass, provided by the present invention, is used, for example, as various lenses such as an aspherical lens, a spherical lens, a microlens, etc., a lens array, a diffraction grating, a lens with a diffraction grating, a prism with a lens function provided on its surface, a filter, and the like.

The invention claimed is:

1. A process for producing an optical element, which comprises precision press-molding a preform formed of an optical glass comprising 17 to 35 mol % of $P_2O_5$, 0.5 to 4 mol % of $SiO_2$, $Li_2O$, 1 to 12 mol % of $Bi_2O_3$, 12 to 23 mol % of $Nb_2O_5$ and 2 to 10 mol % of $TiO_2$ as essential components, comprising $Na_2O$ and $K_2O$ as optional components, having a total content of $Li_2O$, $Na_2O$ and $K_2O$ of over 28 mol % but less than 42 mol % having an $Li_2O/(Li_2O+Na_2O+K_2O)$ molar ratio of from ½ to ⅘, having a total content of $Nb_2O_5$, $WO_3$, $TiO_2$ and $Bi_2O_3$ of 25 to 45 mol % and having an Abbe's number (νd) of 30 or less, a refractive index (nd) of 1.84 or more, a sag temperature (Ts) of 514° C. or lower, a liquidus temperature (LT) of 890° C. or lower, a viscosity, measured at its liquidus temperature, of 2 dPa·s or more and transmittance properties that when light is caused to vertically enter one of two plane and mutually parallel optically polished surfaces of a sample of the glass having a thickness of 10.0±0.1 mm and caused to exit from the other surface, the wavelength at which the transmittance represented by the ratio of transmitted light intensity to incidence light intensity (transmitted light intensity/incidence light intensity) comes to be 70% is 510 nm or shorter.

* * * * *